Nov. 10, 1959 R. T. TOWNSEND 2,912,027
FEEDING AND SLASHING DEVICE FOR SKINNING MACHINE
Filed May 27, 1957 4 Sheets-Sheet 4

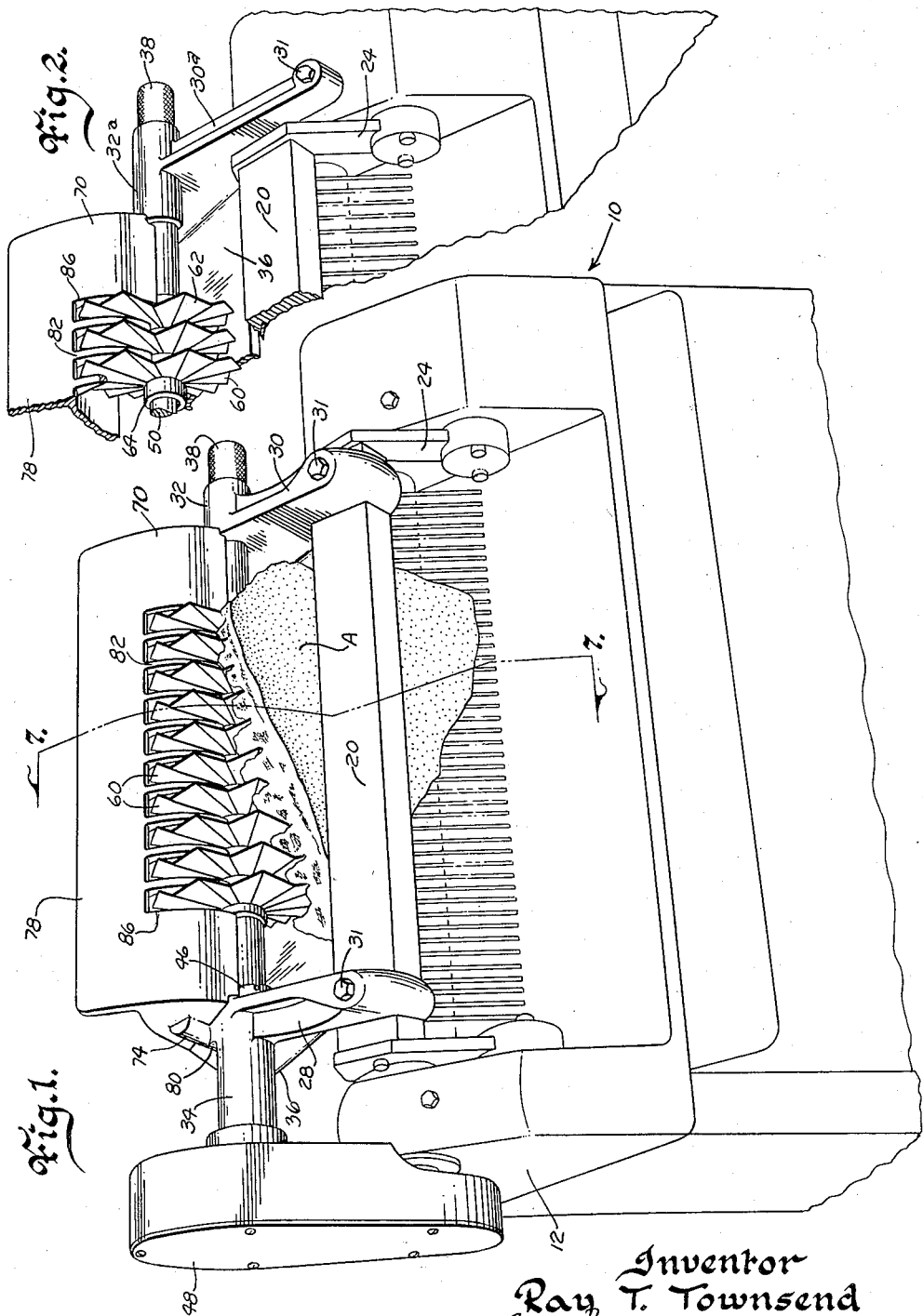

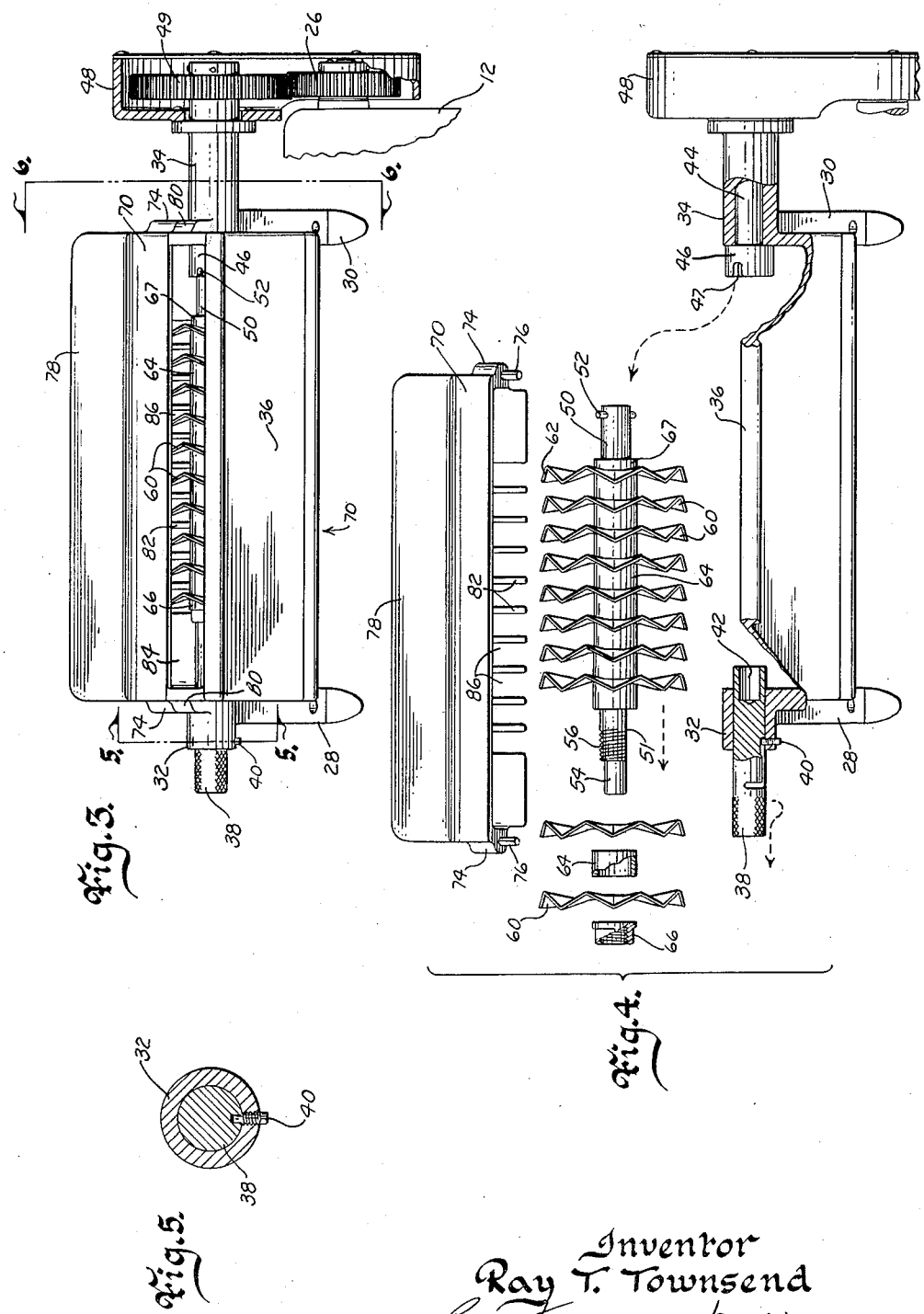

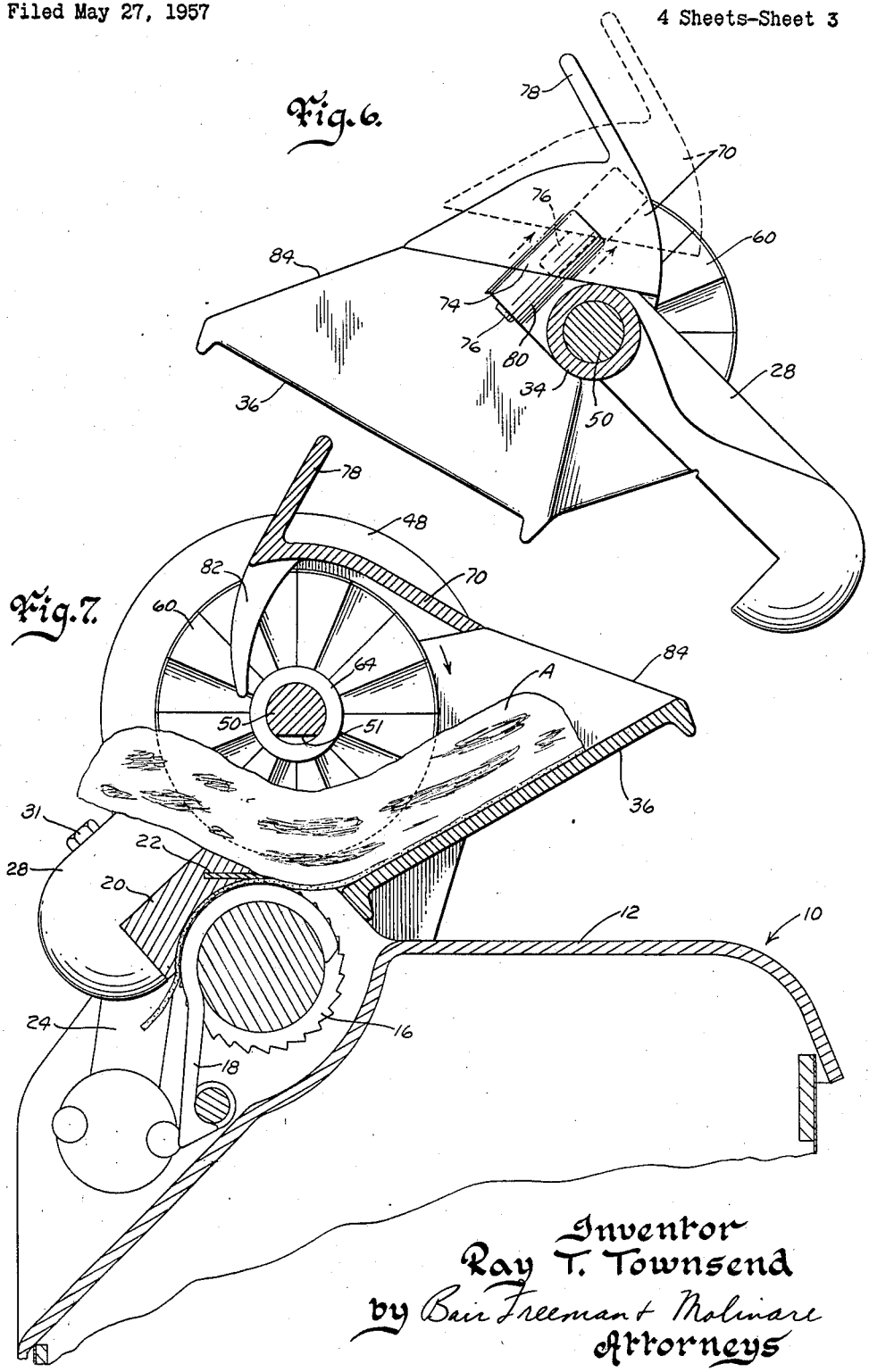

Inventor
Ray T. Townsend
by Dair, Freeman & Molinare
Attorneys

United States Patent Office 2,912,027
Patented Nov. 10, 1959

2,912,027

FEEDING AND SLASHING DEVICE FOR SKINNING MACHINE

Ray Theodore Townsend, Des Moines, Iowa, assignor to Townsend Engineering Company, Des Moines, Iowa, a corporation of Iowa Application May 27, 1957, Serial No. 661,836

5 Claims. (Cl. 146—130)

This invention relates to an improvement in a skinning machine, such as the machine shown in my prior issued patents Reissue No. 23,222 and Patent No. 2,522,728. The skinning machine is of the type which is adapted to remove skin from meat cuts, such as pork jowls, backs, shoulders and similar articles which require removal of a surface layer. The skinning machine is of the type which has a toothed roller and cooperating pressure shoe containing a knife blade for slicing the skin from the cut being processed. The shoe is designed to "float" with respect to the roller to accommodate skins of varying thicknesses. A suitable table is provided for supporting the piece to be skinned. The present invention is directed to an improved machine of this type which is capable of slashing the article being processed and at the same time positively advancing the article through the apparatus. In processing pork jowls, for instance, it is highly desirable to be able to cut (slash) them across their entire width at spaced intervals to locate abscesses that might be present. If an abcess is found the jowl, of course, must be discarded. At the present time this slashing operation is performed manually as a separate step in the processing of hog jowls.

The primary object of the present invention is to provide an improved skinning machine having a combination slashing and feeding device comprising disc-type knives or cutters capable of advancing the piece positively through the skinner with considerable force and speed.

Another object is to provide feeding means which efficiently handles articles of uneven thickness and articles which ordinarily present difficulty in skinning because they are not flat. Frozen cuts, for instance, sometimes present these difficulties.

Another object is to provide a feeding means of this type which also is capable of slicing the object being skinned into a plurality of individual pieces.

These and other objects of the invention will become apparent from the following description when read in conjunction with the accompanying drawings, in which:

Figure 1 is a perspective view of the upper portion of a skinning machine with the feeding and slashing device of the invention mounted thereon;

Figure 2 is a perspective view of the right-hand portion of the machine of Figure 1, showing a modified bearing arm construction;

Figure 3 is a front elevational view of the feeding and slashing device;

Figure 4 is an exploded elevational view of the feeding and slashing device with parts broken away and parts in section;

Figure 5 is an enlarged sectional view taken along the line 5—5 of Figure 3;

Figure 6 is an enlarged sectional view taken along the line 6—6 of Figure 3; and Figure 7 is an enlarged sectional view taken substantially along the line 7—7 of Figure 1;

Figure 8:
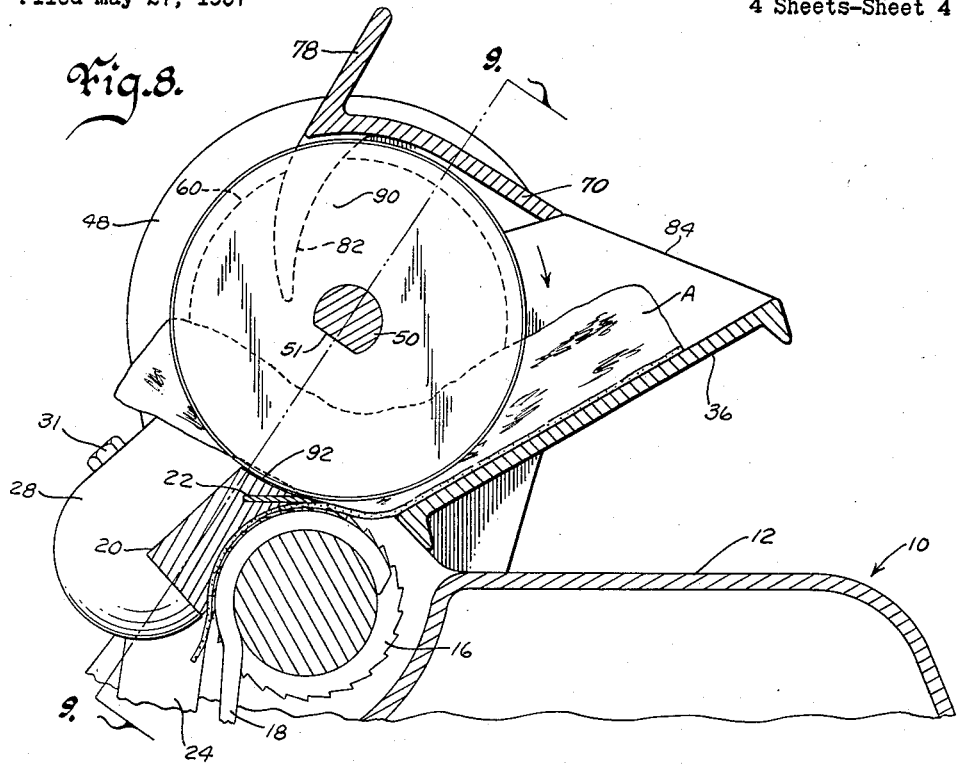
Figure 8 is a sectional view similar to Figure 7 taken along line 8—8 of Figure 9, and showing an alternative form of the invention which cuts the object into separate pieces.

Referring now to the drawings, the skinning machine is designated generally in Figure 1 by the numeral 10. The detailed construction of skinning machine 10 is disclosed in the patents above referred to. Only the portions which cooperate with the device of the invention are illustrated and described in this specification. The frame of the skinning machine is designated generally by the numeral 12 and supports a toothed (serrated-periphery) roll 16, best shown in Figure 7, for stripping the skin from the piece A being processed. A curved pressure shoe 20 covers a substantial portion of the toothed roll 16 and is slightly spaced therefrom. The shoe is pivotally mounted at its lower edge in the arms 24, which are fixed at their lower ends to the frame 12. Thus the shoe will "float" with respect to the roll 16 to increase or decrease the space therebetween as required by the piece being processed. Such movement will generally amount to no more than $\frac{1}{32}"$ to $\frac{1}{16}"$. A cutting blade 22 is secured in a slot in the leading edge of the shoe 20 for severing the skin from the article A. The toothed roll 16 is driven by means of a shaft on the end of which gear 26 is fixed (Figure 3). Suitable power means (not shown) is provided for driving the gear 26 and the roll 16.

The feeding and slashing device is mounted on a pair of arms 28, 30 which may be secured to the top of the shoe 20 by means of bolts 31, as shown in Figure 1. An alternative form of mounting construction is shown in Figure 2 wherein the arms 28, 30 may be mounted directly on the stationary frame of the skinning machine rather than on the shoe. In Figure 2 the arm shown is designated by the numeral 30a and the bearing thereon 32a. In the form of the invention shown in Figure 2 the shoe may move with respect to the toothed roll 16 without changing the location of the slashing device relative thereto. Arm 30 terminates at its outer end in a bearing 32 and the arm 28 terminates in a similar bearing 34, as best shown in Figure 4. Cast integrally with the arms and the bearings is the bottom portion 36 of a housing, which serves as a table to support the articles fed through the machine and an upper portion 70 of this housing cooperates with the bottom portion 36 to serve as an enclosure for the cutting discs of the feeding device. The upper portion 70 of the housing rests on the bottom portion 36. The bearing 32 carries a rod 38 having a blind bore 42 in the inner end thereof which is adapted to receive one end of the shaft 50 on which the cutting discs are mounted, as explained below. The rod 38 is knurled on its outer end to facilitate manually removing it from the bearing 32. To prevent the rod 38 from turning or moving axially within the bearing 32, a set screw 40 is provided, as best shown in Figure 5. The other bearing 34 supports a rotating shaft 44 terminating at its inner end in an enlarged head or socket 46 for receiving the opposite end of the shaft 50. The socket 46 has a pair of opposed slots 47 in the wall thereof adapted to receive the extremities of pin 52 which extends through shaft 50. Thus, when the shaft 44 is rotated the shaft 50 is coupled directly thereto. A gear 49 is secured to the outer end of the shaft 44 which projects beyond the end of the bearing 34. The gear 49 meshes with the gear 26 so that motion imparted to the gear 26 and the roll 16 serves to turn the shaft 44 and thereby the shaft 50 at the same time. The gear ratio is such as to reduce the speed of the shaft 50 with respect to the roll 16. A suitable enclosure or guard 48 is provided to cover the gears 26, 49.

The end portion 54 of the shaft 50 is of reduced diameter and is adapted to rotate within the bore 42. A flat 51 is provided on one side of shaft 50 (Figure 7) for locking the discs. It will be noted that the portion of the shaft 50 adjacent to the end portion 54 is threaded, as indicated at 56. A nut 66 screws onto the threads 56 and a collar 67 is fixed to the opposite end of shaft 50. A plurality of cutting discs 60 slide onto the shaft 50 and are spaced from each other by means of spacer rings 64, as best shown in Figure 4. The central opening through the discs are flat on one side to complement the flat 51 on the shaft 50 to prevent rotation of the disc on the shaft. It will be apparent that the number and spacing of the cutting discs 60 may be varied if desired.

It is essential that the peripheral cutting edge 62 of the discs 60 be of irregular configuration to increase the contact area with the article being skinned. Generally it may be said that the perimeter 62 must be greater than the circumference of a non-corrugated disc of the same diameter. The particular geometric design of the cutting edge is not important so long as it provides some change in direction with respect to the plane of the disc. In the drawing I have shown a cutting edge of zig-zag configuration comprising a series of consecutive edge segments which are disposed at an angle with respect to each other. The corrugated cutting edge 62 of discs 60 is not honed to a sharp edge but remains relatively blunt so that a downward pressure is exerted on the piece being advanced through the apparatus. I have found that cutting the edge at an angle of about 30° with respect to shaft 50 provides a very satisfactroy feeding and slashing surface.

In assembling the device the discs 60 are mounted on the shaft 50 with the spacer rings 64 therebetween. The terminal collar 67 is locked on the shaft against axial movement to space the discs inwardly from the socket 46. Nut 66 is screwed onto the threads 56 to hold the discs securely on the shaft at the other end.

An upper housing portion 70 is provided to enclose the top portion of the discs and to prevent pieces being processed from windnig around the shaft 50. The bottom portion 36 of the housing has a pair of bosses 80 (Figure 1) which are adapted to receive pins 76 projecting downwardly from the ears 74 comprising an integral part of the upper portion 70. The upper housing portion separates from the bottom portion as shown in broken lines in Figure 6. The upper portion 70 is shown in assembled relation with the bottom portion of the housing 36 in Figure 3. When the two parts are assembled, an opening 84 is formed through which the piece A to be skinned is fed into the machine. A flange 78 cast integrally with the upper portion 70 serves as a guard as well as a support for skinned articles to permit examination thereof. Pork jowls, for example, are carried up to the flange 78 by the discs 60 and may be visually inspected with facility when laid over the flange.

The side of the upper housing portion 70 opposite the opening or slot 84 has a plurality of vertical slots 86 adapted to accommodate the discs 60 which project therethrough. The slots 86 define a series of fingers 82 normally disposed between the cutting discs to strip pieces A from the discs embedded therein. The function of the fingers 82 may be best appreciated from an inspection of Figure 7.

In operation, the article to be skinned is fed into the machine through the slot 84. It is supported by the lower housing member 36. One end is immediately engaged by the cutting discs 60 which advance the article toward the toothed roll 16 and cooperating shoe 20. The corrugated cutting discs penetrate the article to within about ¼" to ½" from the bottom, skin side and, consequently, they obtain a good grip on the article. The skin is severed from the lower side, as shown in Figure 7, by means of the knife 22. The rotating toothed roll 16 pulls the skin away from the knife and it falls onto a chute (not shown) and into a suitable receptacle placed beneath the skinning machine. The skinned article is stripped from discs 60 by fingers 82 and removed from the opposite side of the machine, which is the side shown in Figure 1.

This machine operates very rapidly to strip the skin from articles such as meat cuts. There is no problem with respect to obtaining uniform skin removal because the relatively blunt cutting discs flatten the piece out so that it comes into contact with the blade 22 along the entire length thereof. The flattening of the piece is aided by the fact that simultaneous slashing of the piece renders it flexible so that it readily conforms to the supporting surface. Thus, the slashing and feeding device of the invention is capable of processing curved cuts as well as cuts of varying thickness. The cutting discs apply pressure evenly along the entire length of the piece being processed. The device has been found to be particularly advantageous in processing non-flat pieces which are cold or hard.

It will be apparent that in addition to positively feeding the cut into the skinning portion of the apparatus, the cutting discs 60 simultaneously perform the slashing operation which is essential in locating abcesses in hog jowls.

The meat products which are skinned on the apparatus of the invention are customarily used for sausage or similar comminuted meat products and, hence, the slashing is advantageous since it provides precomminution of the product. The fat removed in the skinning operation is usually used for lard or it might be put through a grinder in making sausage. Therefore, any slashing of the fat is an advantage. The slashed fat renders out more readily.

Figure 9:
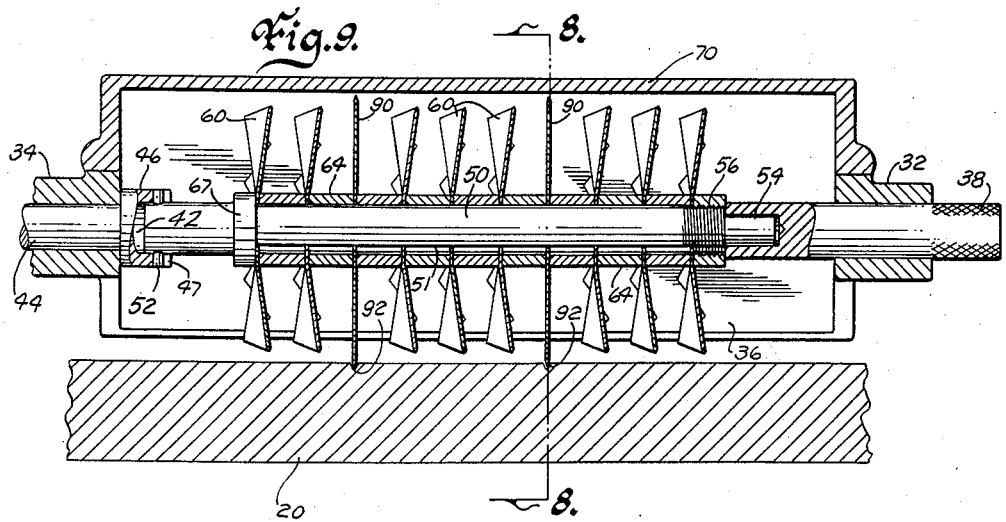
Figure 9 is a sectional view taken along line 9—9 of Figure 8.

In Figures 8 and 9 I have illustrated an alternative form of the invention wherein additional cutting discs 90 have been rigidly mounted on the shaft 50 at spaced intervals between the corrugated discs 60. This modified device is employed where it is desired to slice the article A into smaller pieces as it is being skinned. The discs 90 are larger in diameter than discs 60 and, of course, do not have the corrugated edge. In other respects they correspond in structure to discs 60. To insure complete separation of the individual pieces resulting from the slicing operation a small groove 92 is provided in the face of the shoe 20, which groove receives the lower edge of the cutting disc 90. One groove is provided for each disc. It will be appreciated that any desired number of discs 90 may be placed on the shaft, depending upon the number of individual pieces into which article A is to be divided.

Some changes may be made in the arrangement and construction of the various parts of my feeding and slashing device for a skinning machine without departing from the real spirit and purpose of my invention, and it is my intention to cover by my claims any modified forms of structure or use of mechanical equivalents which may be reasonably included within their scope.

What I claim as new and desire to secure by Letters Patent of the United States is:

1. In a skinning machine having a frame, a serrated-periphery driven roll mounted thereon and a pressure shoe surrounding a portion of said roll having a leading edge and a skinning blade projecting from said leading edge, the improvement comprising a plurality of rotatable cutting discs mounted on a shaft above said toothed roll, said discs having a corrugated peripheral cutting edge held spaced from said driven roll by said shaft for slashing an article to be skinned and simultaneously feeding said article past said skinning blade and its skin between said blade and said driven roll, the spacing between said driven roll and said shaft being such that said peripheral cutting edge is adjacent but does not cut into the skin of said article.

2. The skinning machine of claim 1 wherein a housing is provided substantially enclosing said cutting discs, which housing has a plurality of fingers extending between said cutting discs to keep them clean.

3. The skinning machine of claim 1 which also incudes means for simultaneously driving said shaft from said driven roll.

4. In a skinning machine having a frame, a driven roll mounted thereon and having a toothed periphery, a pressure shoe surrounding a portion of said roll having a leading edge, and a skinning blade projecting from said leading edge, the improvement comprising a plurality of cutting discs, having a corrugated peripheral cutting edge, mounted on a shaft above said shoe for penetrating an article to be skinned to a plane therein adjacent the inner surface of the skin thereof and positively advancing it past said skinning blade, and a plurality of straight-edged cutting discs mounted on said shaft between said corrugated discs and of greater diameter than said corrugated cutting discs for slicing said article into individual pieces.

5. The skinning machine of claim 4 wherein said shoe contains grooves adapted to receive the cutting edges of said straight-edged cutting discs adjacent thereto to insure complete severing of said article into individual pieces.

References Cited in the file of this patent

UNITED STATES PATENTS

| | | |
|---|---|---|
| 942,448 | Humeston | Dec. 7, 1909 |
| 1,204,009 | Goodwin | Nov. 7, 1916 |
| 1,487,226 | Frahm | Mar. 18, 1924 |
| 1,565,887 | Andrus | Dec. 15, 1925 |
| 1,729,611 | Forrest | Oct. 1, 1929 |
| 2,029,701 | Burditt | Feb. 4, 1936 |
| 2,212,066 | Fry | Aug. 20, 1940 |
| 2,522,728 | Townsend | Sept. 19, 1950 |
| 2,722,255 | Townsend | Nov. 1, 1955 |